Figures 1, 2, 3:
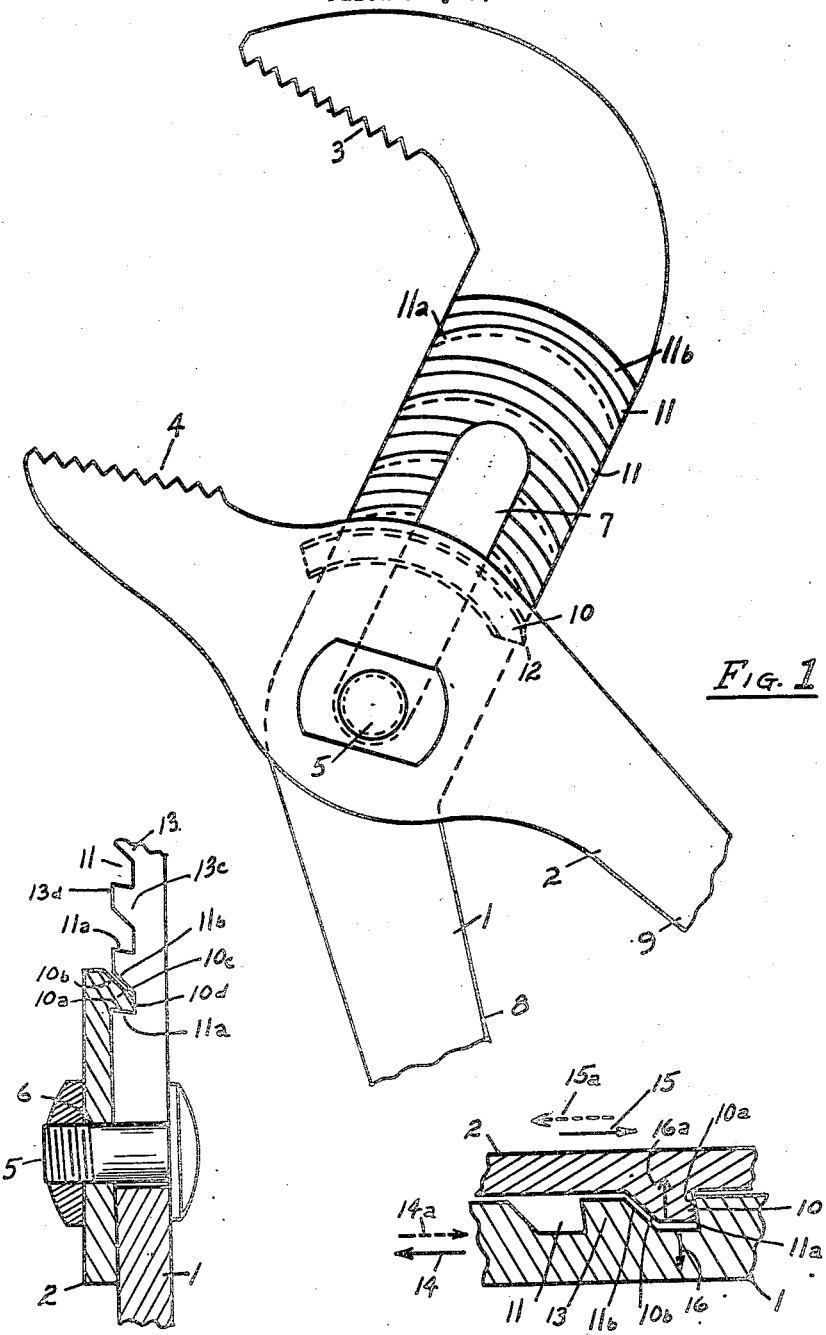

Inventor
Howard H. Manning
By Ralph Hammar
Attorney

Patented June 2, 1953

2,640,381

UNITED STATES PATENT OFFICE 2,640,381

TOOL

Howard H. Manning, Meadville, Pa., assignor to Champion De Arment Tool Company, Meadville, Pa., a corporation of Pennsylvania Application July 9, 1951, Serial No. 235,800

3 Claims. (Cl. 81—51.3)

This application is a continuation-in-part of application Serial No. 120,309, filed October 8, 1949.

This invention relates to hand tools, such as pliers, having crossed members pivoted by tongue and groove joint elements. In the preferred form there are a plurality of joint elements on one of the members which are selectively usable for different jaw openings. In such tools it is desirable that the jaws work freely, particularly in the opening direction, and that the tools be of light weight so as to be easily handled. It is also desirable that the jaws remain in alignment under working pressure. This invention is intended to achieve these objects by having the tongue and groove elements formed by intermeshing arcuate ribs converging from the base or root toward the crest and with the engaging faces on the pressure side inclined or undercut so as to cause the jaw members to cling together. The converging at the crests results in greater strength and ease of opening. The undercutting of the pressure faces holds the jaws in alignment under working pressure.

In the drawing, Fig. 1 is a side view of a pair of pliers, Fig. 2 is a section on line 2—2 of Fig. 1, and Fig. 3 is a fragmentary section illustrating the operation.

The invention is shown applied to a tool of the construction illustrated in my Patent 1,950,362. As there shown, the tool comprises crossed pivoted members 1 and 2 respectively provided with jaws 3 and 4 at one side of a bolt 5 extending through an opening 6 in the member 2, and through a slot 7 in the member 1. On the opposite side of the bolt, the members are provided with handles 8 and 9. On the member 2 is an arcuate rib 10 receivable in any one of a plurality of arcuate grooves 11 in the member 1. The width of the jaw opening is adjusted by sliding the member 2 carrying the bolt 5 along the slot 7 until the pointed or beveled end 12 of the rib 10 comes opposite the desired groove 11. From one aspect the rib 10 and groove 11 are tongue and groove joint elements on adjacent faces of the members 1 and 2. The beveled end 12 tends to lead the rib into the desired groove.

Under working conditions it is desirable that the jaws 3 and 4 remain in essentially the same plane so that the gripping surfaces will oppose each other. Lateral offsetting of one of the jaws relative to the other which would tend to move the gripping surfaces of the jaws out of opposed relation and to disengage the tongue and groove elements is undesirable. In the present construction lateral offsetting is prevented by making both the tongue and groove elements 10 and 11 with inclined or undercut sides or faces 10a, 11a on the working pressure side. The faces 10a, 11a, which engage in any selected position of the pliers are slanted in the direction to provide an interlock preventing lateral off-setting movement of the jaws relative to each other. The engaging pressure on faces 10a, 11a exerts a force causing the members to cling together. This force is only present when the jaws are under pressure. Only a very slight inclination is necessary to provide the interlock against lateral off-setting. If preventing lateral off-setting is not desired, the faces 10a, 11a can be at right angles to the jaw members 1 and 2.

The opposite faces 10b, 11b, which do not engage under working pressure, have a pronounced slope (greater than the slope of the faces 10a, 11a) in the direction to cause spreading rather than clinging if these faces should engage. This results in the rib 10 and the ribs 13 forming the grooves 11 each converging from wider bases 10c, 13c toward narrower crests 10d and 13d, which are the narrowest portions of the ribs. At the start of the opening stroke, if the faces 10b and 11b should be engaged, the spreading resulting from the slope of the faces would automatically increase the clearance between the ribs 10 and 13, which means that the opening of the jaws is always easy and free from binding. This shape of rib also results in greater strength. The tip or crests of the ribs which are narrowest are subjected to the least stress. The wider bases of the ribs which are subjected to the greatest stress have sections in proportion to the greater stress.

The freedom from binding and from lateral off-setting of the jaws is obtained even if the jaws are temporarily off-set by a twisting force applied during use or are permanently off-set by one of the jaws becoming bent by abuse. When the jaws are off-set, for any reason, the rib 10 merely meshes or penetrates less deeply into the selected groove 11. With the lesser penetration of the rib 10 into the selected groove 11, there is a greater clearance between the rib and groove which prevents binding.

It is essential that the pin 5 be freely slidable lengthwise but not cross-wise of the slot 7.

The action under the forces present during opening and closing of the jaws is illustrated in Fig. 3. When the jaws are being closed, there is a force exerted on jaw 3 in the direction of arrow 14 and a force exerted on jaw 4 in the direction of arrow 15. These forces tend to bring the undercut faces 10a, 11a into engagement and due to the undercut, a force is exerted on the member 2 in the direction of arrow 16, or in the direction to cause deeper penetration of the rib 10 into the selected groove 11. The force in the direction of arrow 16 is ordinarily insufficient to cause further penetration of the rib 10, due to the friction forces on the faces 10a, 11a but even with a slight undercut on the faces 10a, 11a is always sufficient to cause the rib 10 to cling to the selected groove. During opening of the jaws, the forces tend to be in the opposite direction as indicated by the arrows 14a, 15a bringing the faces 10b, 11b into engagement and resulting in a spreading force on the member 1 in the direction of arrow 16a. This spreading force is in the direction to decrease the penetration of the rib 10 or in the direction to increase the clearance between the rib and groove.

This insures free or easy opening of the jaws which is desirable in tools of this type.

The free lengthwise sliding of the pin in the slot prevents interference of the faces 10a, 11a, when the rib 10 only partially penetrates the depth of the selected groove. The lack of crosswise movement of the pin in the slot keeps the rib and groove centered so binding or locking of the jaws under pressure is prevented, such binding being due to a pivoting about a point of engagement of the rib and groove.

What is claimed as new is:

1. In a tool having a pair of crossed members, work engaging surfaces on the members, and a pivotal joint between the members comprising a pin and slot connection preventing lateral shifting of one member relative to the other in a direction crosswise of the slot but freely permitting movement of one member relative to the other lengthwise of the slot, said pivotal joint including interfitting concentric arcuate tongue and groove elements of substantially the same radius respectively on adjacent faces of the members, the elements being formed of arcuate ribs of the same radius on said adjacent faces, one rib being on one of the adjacent faces and a plurality of ribs being on the other of the adjacent faces the ribs converging in cross section from wider bases toward narrower crests with abrupt arcuate faces on the sides of the ribs engaging under pressure and with arcuate faces on the sides of the ribs which do not engage under working pressure sloped in the direction to cause spreading.

2. In a tool having a pair of crossed members, work engaging surfaces on the members, and a pivotal joint between the members comprising a pin and slot connection preventing lateral shifting of one member relative to the other in a direction crosswise of the slot but freely permitting movement of one member relative to the other lengthwise of the slot, said pivotal joint including interfitting concentric arcuate tongue and groove elements of substantially the same radius respectively on adjacent faces of the members, the elements being formed of arcuate ribs of the same radius on said adjacent faces, one rib being on one of the adjacent faces and a plurality of ribs being on the other of the adjacent faces the ribs converging in cross section from wider bases toward narrower crests with arcuate faces on the sides of the ribs engaging under working pressure undercut to cause the engaged faces to cling together under working pressure and with arcuate faces on the sides of the ribs which do not engage under working pressure sloped in the direction to cause spreading.

3. In a tool having a pair of crossed members, work engaging surfaces on the members, and a pivotal joint between the members comprising a pin and slot connection preventing lateral shifting of one member relative to the other in a direction crosswise of the slot but freely permitting movement of one member relative to the other lengthwise of the slot, said pivotal joint including interfitting concentric arcuate tongue and groove elements of substantially the same radius respectively on adjacent faces of the members, the elements being formed of arcuate ribs of the same radius on said adjacent faces, one rib being on one of the adjacent faces and a plurality of ribs being on the other of the adjacent faces, said ribs having arcuate faces on the sides engaging under working pressure undercut to cause the engaged faces to cling under working pressure.

HOWARD H. MANNING.

References Cited in the file of this patent

UNITED STATES PATENTS

| Number | Name | Date |
|---|---|---|
| 538,991 | Henderson | Aug. 31, 1897 |
| 1,950,362 | Manning | Mar. 6, 1934 |

FOREIGN PATENTS

| Number | Country | Date |
|---|---|---|
| 99,868 | Sweden | July 18, 1940 |